United States Patent [19]
Griffith et al.

[11] 4,345,195
[45] Aug. 17, 1982

[54] STRAPDOWN MULTIFUNCTION SERVOACTUATOR APPARATUS FOR AIRCRAFT

[75] Inventors: Carl D. Griffith; Kenneth L. Oliver, both of Phoenix, Ariz.

[73] Assignee: Sperry Corporation, New York, N.Y.

[21] Appl. No.: 176,321

[22] Filed: Aug. 8, 1980

Related U.S. Application Data

[63] Continuation-in-part of Ser. No. 103,243, Dec. 13, 1979.

[51] Int. Cl.³ .............................................. G05B 11/01
[52] U.S. Cl. ..................................... 318/628; 318/580; 318/584; 318/586; 318/626; 244/223
[58] Field of Search ............... 318/628, 626, 584, 585, 318/580, 586; 244/223

[56] References Cited

U.S. PATENT DOCUMENTS

| | | | |
|---|---|---|---|
| 3,369,161 | 2/1968 | Kaufman | 318/626 X |
| 3,733,039 | 5/1973 | O'Conner et al. | 318/585 X |
| 4,079,902 | 3/1978 | Ryzhko et al. | 318/626 X |
| 4,228,386 | 10/1980 | Griffith | 318/584 |

*Primary Examiner*—B. Dobeck
*Attorney, Agent, or Firm*—Howard P. Terry

[57] ABSTRACT

Strapdown, multifunction actuator apparatus comprising one or two integral units adapted for installation in an aircraft, particularly a helicopter, and coupled between the pilot's control stick linkage and the aircraft control surface (or surface servo boost) linkage to perform the functions of series actuation, trim actuation, artificial feel, control position sensing, and control authority limits. The apparatus includes a series actuator installed in the vehicle and connected to the vehicle control linkages in the conventional parallel actuator manner; that is, it is secured directly or strapped down to the airframe and therefore greatly simplifies control system installation and reduces problems such as those associated with control rod vibration resonances normally encountered with conventional integral-with-linkage series actuator installations.

18 Claims, 9 Drawing Figures

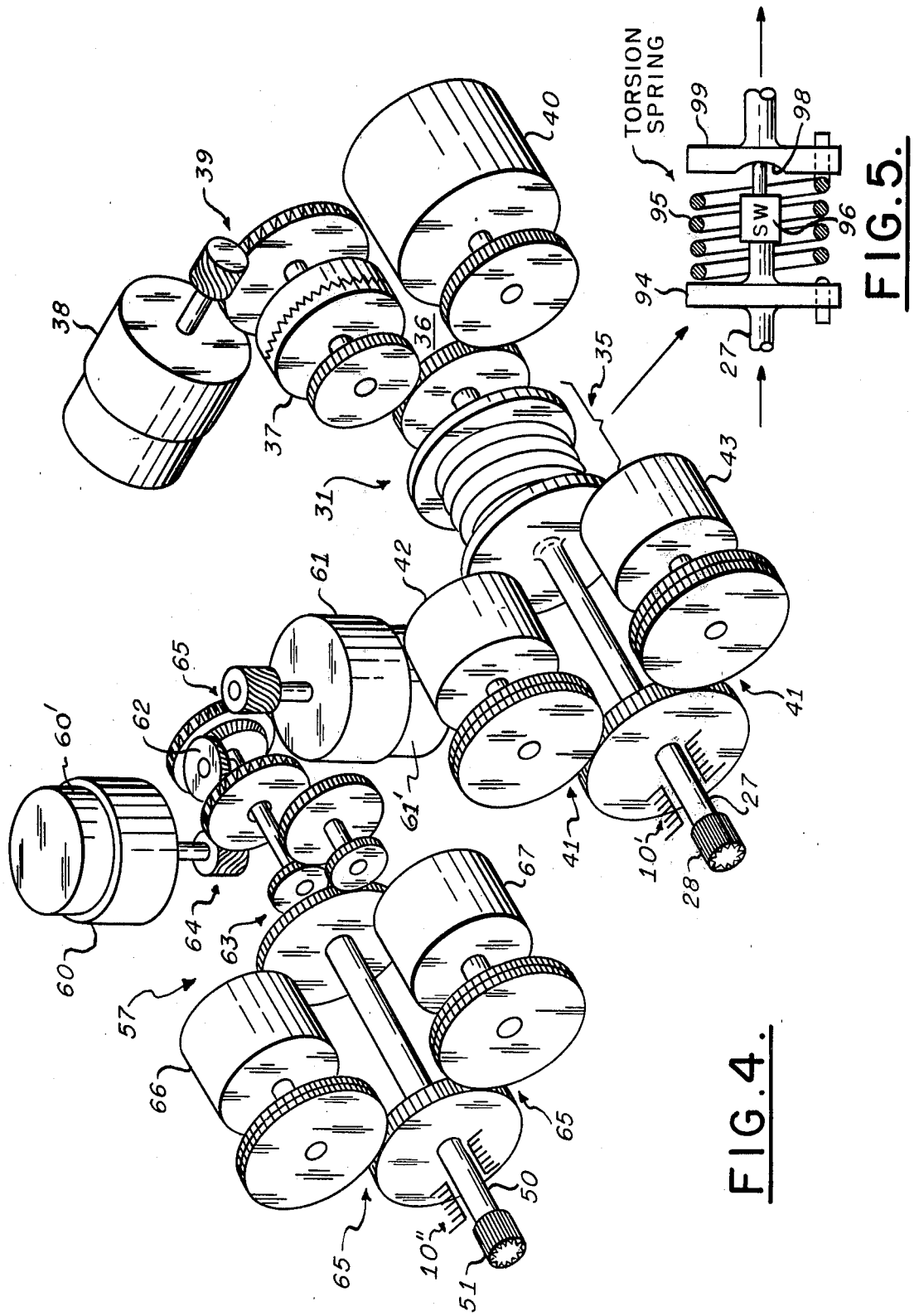

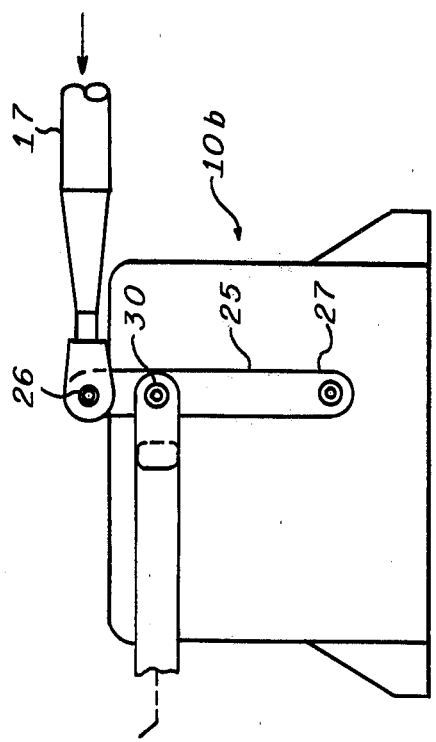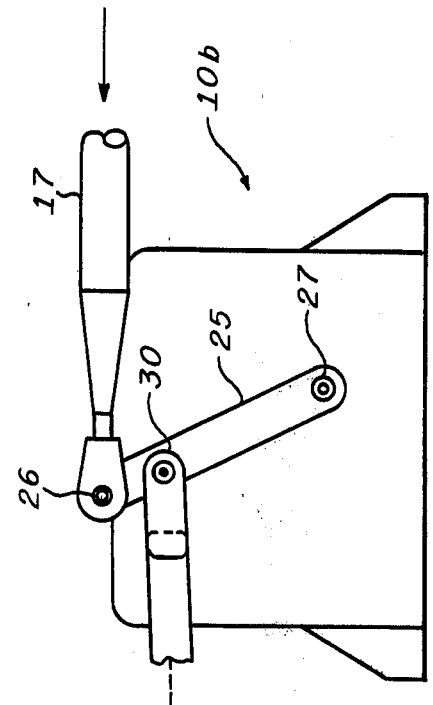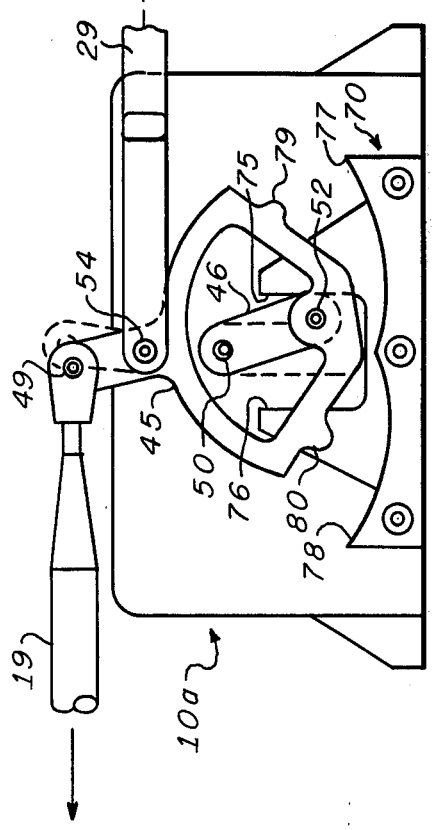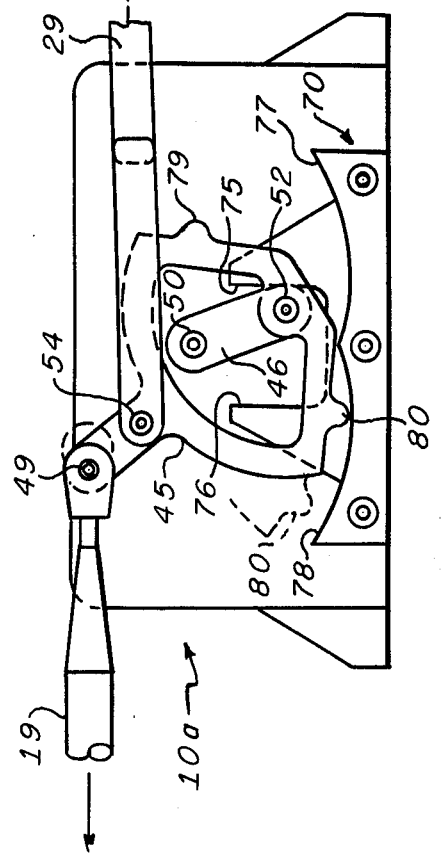
FIG.6.
FIG.7.

STRAPDOWN MULTIFUNCTION SERVOACTUATOR APPARATUS FOR AIRCRAFT

CROSS REFERENCE TO RELATED APPLICATION

The present application is a continuation-in-part of copending application Ser. No. 103,243, filed Dec. 13, 1979 entitled "Strapdown Multifunction Servoactuator Apparatus for Aircraft" in the same names as the present application and assigned to the same assignee.

BACKGROUND OF THE INVENTION

1. Field of the Invention

This invention relates to control actuators for aircraft, particularly helicopters, and, more particularly, to improvements in a series, trim, artificial feel actuators and combinations thereof of the general character disclosed in copending application Ser. No. 912,165, filed June 2, 1978 in the name of Carl D. Griffith and entitled "Aircraft Servoactuator Apparatus" now U.S. Pat. No. 4,228,386, said application also being assigned to the same assignee as the present invention.

2. Description of the Prior Art

Heretofore, the installation of an automatic Stability Augmentation System (SAS) and/or an Automatic Flight Control System (AFCS) as original or retrofit aircraft equipment, particularly in helicopters, normally comprised a number of separated components usually located at separate and convenient points in the control rigging (illustrated schematically in FIG. 1 of the accompanying drawings). Such components included a series actuator, usually contained within a control rod for increasing or decreasing its length in accordance with an electrical command from the SAS or AFCS computer, automatic and manual control authority limit stops, stick position transducers, an artificial feel spring mechanism having detent switches and a manual and/or automatic trim actuator and brake mechanism, and the like. In the retrofit of such actuators and associated components particularly in helicopters, the installation was more difficult, involving costly and time consuming modifications to the existing manual flight controls and linkage systems. As the above items are typically required for each axis of control, the SAS and/or AFCS original installation and retrofit becomes extremely difficult and time consuming adding not only to the aircraft's overall weight but also, significantly, to its total cost of ownership, considering maintenance and replacement costs.

Aircraft servoactuators are generally of two types: parallel and series, both of which are well known in the aircraft automatic control art. The parallel actuator is hard-mounted or bolted directly to the airframe and thus not severely affected by a high vibration environment as compared with conventional series actuator installations. A parallel actuator system is normally the autopilot actuator wherein its movement is reflected both at the control surface and the control stick. A series actuator, however, is not normally secured to the aircraft body structure but, rather is coupled in the control linkages or push-rod assemblies between the pilot's stick and the control surface; that is, it is floating or ungrounded and hence severely adversely affected in the high vibrating environment usually associated with a helicopter. The series servo motion does not move the pilot's stick and normally has a limited control authority over the control surface. Furthermore, as stated, the series actuator is usually installed in the control push-rods which, particularly in a retrofit situation, alters their natural resonances to local vibrations such as produced by the sustaining rotor.

SUMMARY OF THE INVENTION

In accordance with the teachings of the present invention, the difficulties of the prior art series actuators with respect to the stabilization and automatic control of the aircraft or helicopter control elements are to a great extent eliminated.

Specifically, the invention comprises electromechanical actuator apparatus, particularly suited to, but not limited to, helicopters, for providing the multiple functions of series servo actuation (single or dual), trim servo actuation, artificial feel, series servo position sensing, control stick position sensing and manual and automatic control authority limiting, the unit or units being hard mounted to the airframe structure whereby to simplify greatly original and/or retrofit and maintenance, service and repair installation and to be less affected by vehicle vibrations.

More specifically, the actuator apparatus of this invention comprises one or two unitary housings adapted to be bolted to the airframe and having external linkages coupled to the pilot's control stick and to the associated control surface or swash plate or the power boost actuator therefor. These linkages are also connected to elements within the housing or housings for varying or governing their movements and hence the movements of the control surface and control stick. The external linkage coupled to the control stick is connected internally with stick position sensors, an artificial feel element, a trim servomotor through an irreversible drive and a magnetic clutch and damper mechanism while the external linkage coupled with the control surface (or boost actuator) is connected internally to a single series servomotor through an irreversible drive, or to dual series servomotors through irreversible drives and a differential, and to series servo position sensors. The latter linkage includes a series servo link and a differential linkage coupled between the control surface, the series servo link and the control stick linkage permitting direct operation of the control surface from the series servo and/or from the control stick due to the irreversible series servo drive. Also associated with the differential link and series servo link are specially contoured mechanical stops for limiting the control authority of the series servo to a predetermined value and that of the pilot's stick to a predetermined constant value regardless of the series servo link position. The stop element is a unitary structure removably secured to the external surface of the housing thereby conveniently permitting stop elements of various predetermined contours to be provided depending upon the authority limit characteristics of the particular aircraft in which the actuator apparatus is to be installed.

In those applications of the invention where space permits, the above described elements may all be contained in a single, unitary housing. Where space does not permit, the series actuator and the trim/feel actuator may be contained in separate housings having a common interconnected linkage mechanism. Alternatively, where space permits, the latter two housings may be integrally joined together to form a unitary unit. Of course, the two linkage connected units may be secured to the airframe next to each other or closely adjacent each other.

BRIEF DESCRIPTION OF THE DRAWINGS

The multifunction actuator apparatus of the present invention will be described in connection with an illustration of a preferred embodiment thereof as installed in a helicopter although it will be understood that it may be installed in other types of aircraft.

In drawings:

FIG. 4 is an isometric schematic of the principal elements contained within the actuator housing of FIG. 3;

FIG. 5 is a detail of the torsion spring element of FIG. 4;

FIGS. 6 and 7 are detailed views of the actuator linkages in their limit positions and illustrating a separation of the two strapdown units interconnected by a common linkage;

DESCRIPTION OF THE PREFERRED EMBODIMENT

Figure 1:
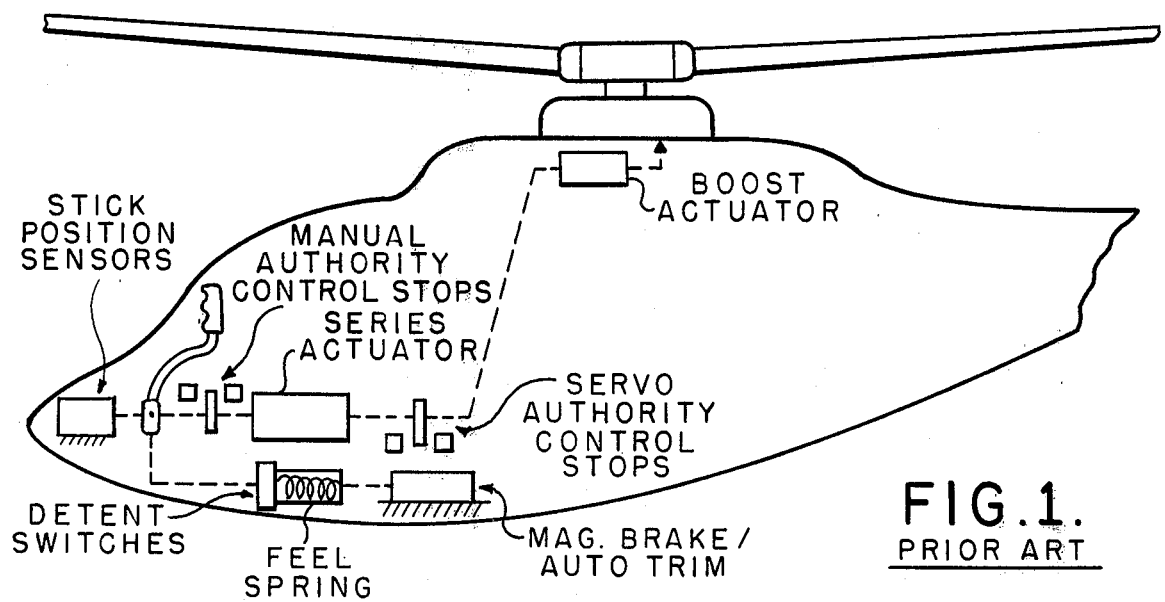
FIG. 1 is a schematic illustration of a typical prior art installation of series and feel/trim actuators and related components normally required for a SAS- and/or AFCS-equipped helicopter.

Referring first to FIG. 1 which illustrates a typical prior art installation of individual components normally required in a SAS- or AFCS-equipped helicopter, it is noted that these components are all separately mounted elements and normally include elements associated with automatic or manual trim and artificial feel, that is, a trim motor and a feel spring. Associated with these are a magnetic brake for adjustably "grounding" one end of the feel spring and detent switches for controlling the SAS or AFCS; also for the latter stick position sensors are required. Automatic control of the swash plate via the SAS or AFCS is provided by a series actuator conventionally included within and as an integral part of a control rod coupled between the stick and the swash plate boost actuator. A typical prior art arrangement is illustrated in U.S. Pat. application Ser. No. 906,176, filed May 15, 1978 in the name of C. R. Stribley, entitled "Tunable Coupling Apparatus", and assigned to the Applicants' assignee. At least two sets of limit stops are required, one for limiting the authority of the stick commands and one for limiting the authority of the automatic or series servo commands. A more complete discussion of the function of the foregoing elements will be provided when they are described in connection with the actuator apparatus of the present invention.

Figure 2A:
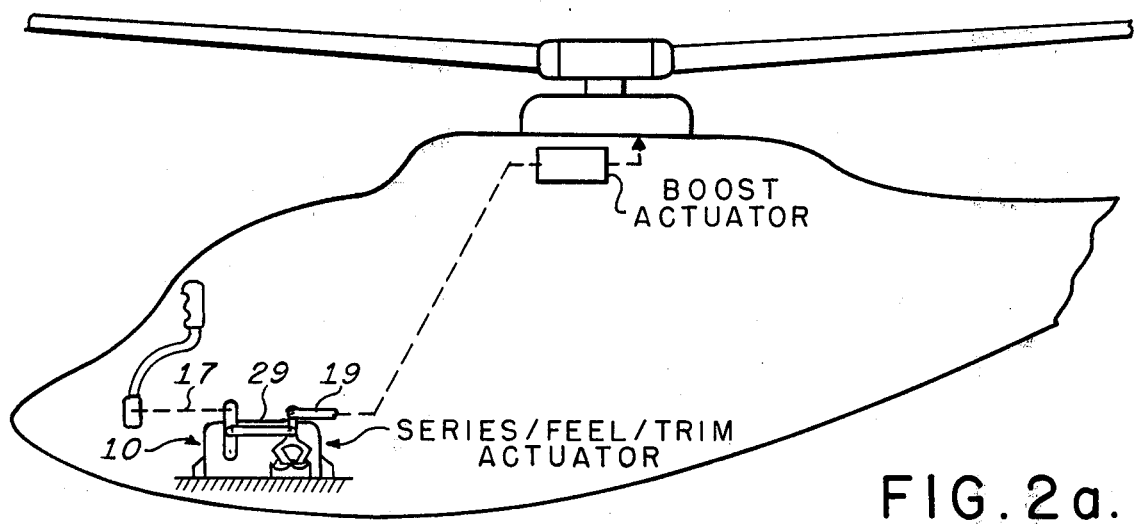
FIGS. 2A and 2B are similar illustrations of the installation of the strapdown actuator apparatus of the present invention.
Figure 2B:
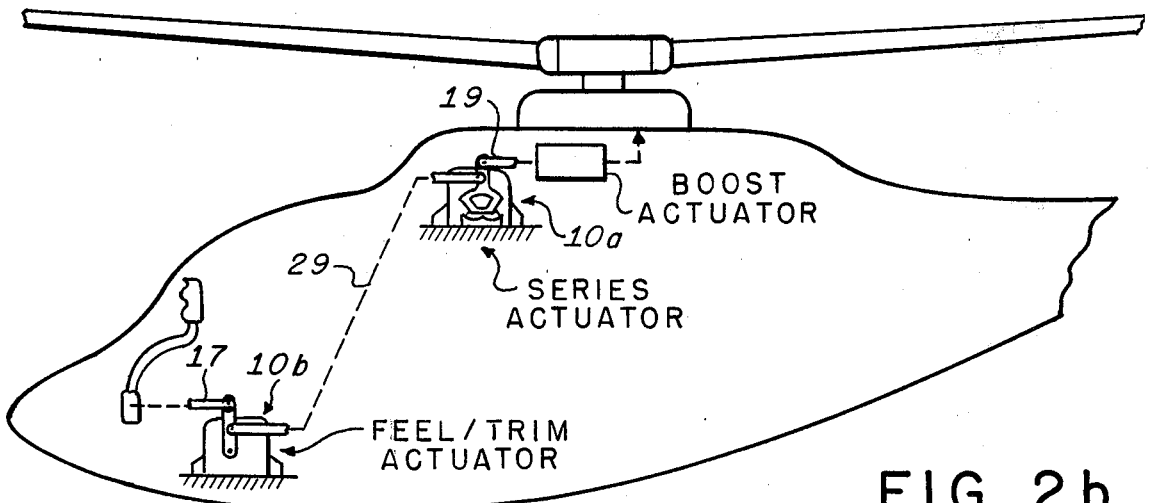

FIGS. 2A and 2B illustrate two typical installations of the strapdown actuator apparatus of the present invention; FIG. 2A illustrating this apparatus as a single integral structure or housing 10 strapped down to the airframe including a connection link 29, as will be described in detail in connection with FIG. 3, while FIG. 2B illustrates this apparatus as two separate housings, 10a and 10b, strapped down to the airframe at relatively remote positions in the helicopter and interconnected by common link 29 as will be described in detail in connection with FIGS. 6 and 7. It will be understood, of course, that the two housings 10a and 10b of FIG. 2B may be bolted or otherwise integrally joined together to form the housing 10 of FIG. 2A or alternately may be bolted down to the airframe adjacent each other.

Figure 3:
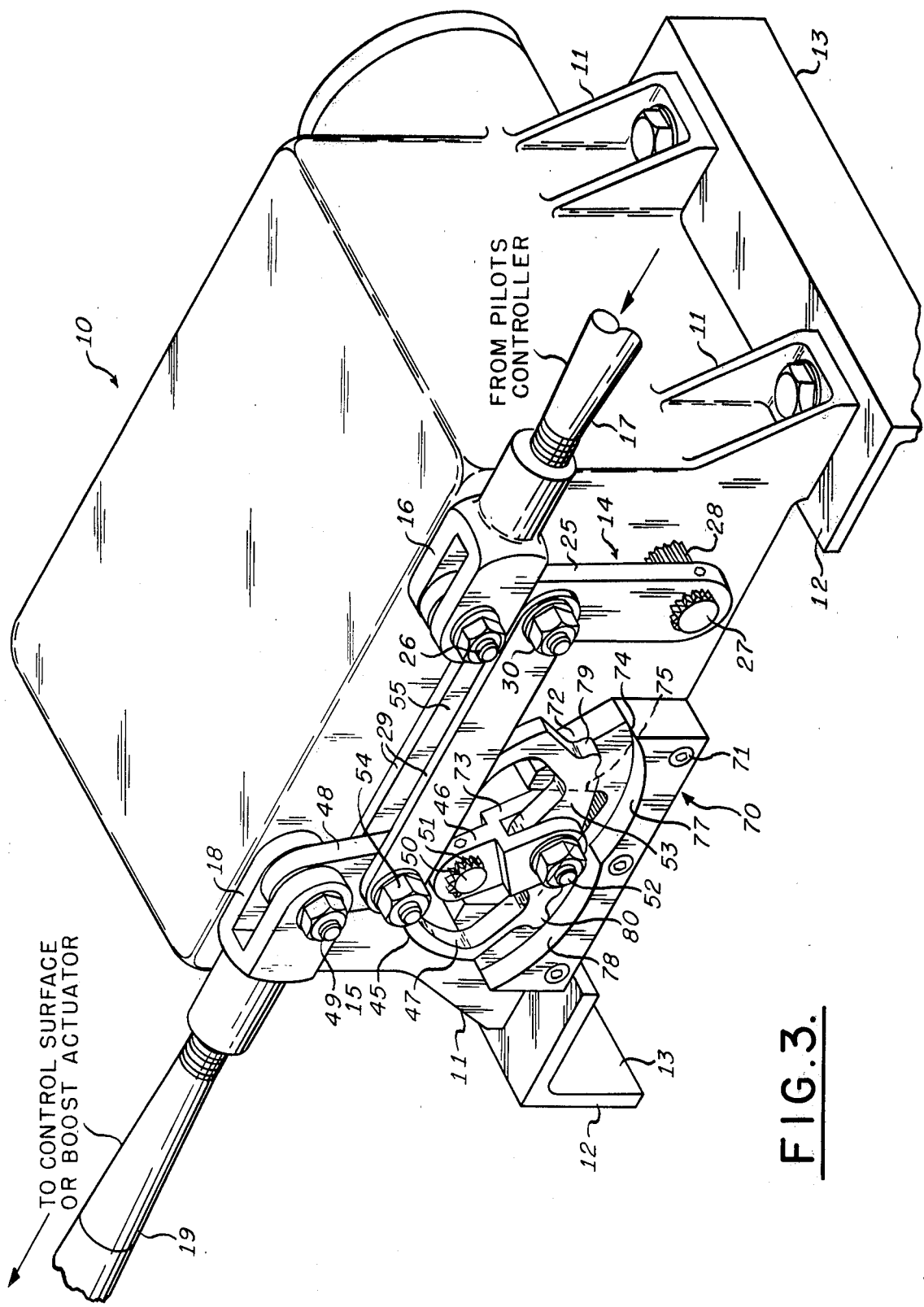
FIG. 3 is an external view of the actuator apparatus of the present invention as a unitary housing bolted down to fixed structural members of the airframe and situated thereon for connection with control push rods associated with the pilot's control stick and the control surface, or surface boost actuator.

Referring now to FIG. 3, there is illustrated pictorially the overall configuration of the integrally packaged multifunction servoactuator of the present invention intalled as in FIG. 2A. It comprises generally a diecast housing 10 having mounting flanges 11 by which it may be secured directly to suitably drilled mounting surfaces 12 of rigid structural members 13 which are part of the aircraft's basic structure, sometimes referred to as the airframe. The location of the actuator in the aircraft is selected, typically as in FIG. 2A, so that it is conveniently adjacent to the control system. In the embodiment illustrated, the actuator includes external linkage assemblies 14 and 15, the linkage 14 being connected as by clevis 16 to the flight control system push rod 17 coupled with the pilot's controller, such as the helicopter cyclic control stick shown in FIG. 2A. The linkage assembly 15 is connected as by clevis 18 to the flight control system push rod 19 coupled with the flight control surface, or as is familiar to those skilled in this art, to a servo boost actuator which in turn operates the surface also as shown in FIG. 2A. It will be understood, of course, that the actuator linkages 17 and 19 may be connected with corresponding or equivalent control cables characteristic of fixed wing aircraft rigging and these connections may be generally referred to as actuation members. As is of course known, in a helicopter, its pitch and roll attitude are controlled by tilting the sustaining rotor by operation of the cyclic stick, yaw attitude is controlled through changing the thrust of the anti-torque propeller (in single rotor helicopters) by operation of the "rudder" pedals while craft vertical motion is controlled by controlling the thrust or lift of the sustaining rotor by operation of the collective stick. The multifunction actuator apparatus of the present invention may be used with any one or all of these flight controllers. Therefore, in the present specification, it will be understood that the use of the term control surface should be construed as pertaining not only to all of these helicopter attitude control mechanisms, but also to fixed wing aircraft control surfaces.

The linkage 14, which may be referred to as the input linkage, comprises an elongated bar link 25 to the upper end of which is pivotally fastened the clevis 16 by means of suitable bolt and nut fasteners 26, which in this specification will also be referred to as pivot 26. The lower end of bar link 25 is rigidly secured to a shaft 27 extending from within and journalled in suitable bearings, schematically illustrated at 10' in a side wall of the housing 10, as by a suitable spline and pin connection 28. At a point intermediate the ends of link 25 is pivoted one end of a parallel common, and in this embodiment linkage 29 as by similar bolt and nut connection 30 which will also be referred to as pivot 30 for purposes to be further discussed below.

Referring now to FIG. 4, the elements within actuator housing 10 associated with protruding shaft 27, and hereinafter referred to as the feel/trim actuator assembly 31, will now be described. This shaft 27 is connected to one end of a torsion spring assembly 35 which provides artificial surface load feel for the pilot when he operates the control stick since normally the boost actuator of FIGS. 1, 2A and 2B operates the control surface. The other end of spring 35 is adjustably grounded by being connected through gearing 36, magnetic clutch 37 and trim motor 38 which according to the present invention drives through an irreversible gear train 39. Therefore, with the trim motor de-energized and clutch 37 engaged, the irreversible gear train 39 provides a positive ground for the torsion spring 35. Alternatively a very high gear ratio between the motor 38 and spring may provide the spring "ground". The assemblage thus constitutes a means for providing a normally fixed reference position for the feel spring 35. Also driven through gearing 36 is a conventional viscous damper assembly 40, the function of which is to prevent any sudden uncontrolled "unwinding" of the torsion spring 35 upon disengagement of clutch 37 in some modes of operation, as will be described later. Also connected to shaft 27 through one-to-one antibacklash gearing 41 are a pair of signal generators such as synchros 42 and 43. While the function of these will also be described later, it is clear that these synchros provide electric signal outputs proportional to the position of the pilot's control stick.

Returning back to FIG. 3, it will be noted that the linkage assembly 15 that is coupled with the control surface, and hence may be referred to as the output linkages, is somewhat more complex than the input linkage 14. According to the invention it comprises a specially configured differential link 45 and what will be referred to as a series servo link or simply the servo link 46. Differential link 45 is specially configured to provide at its lower end an open frame-like section and what may be best described as an open, truncated wedge-of-pie-shaped section 47, it being an open frame so that the short servo link or drive link 46 may be located and movable within the opening and essentially coplanar with it. In the integral housing embodiment of FIG. 3, both linkage assemblies 14 and 15 are also preferably substantially coplanar. The upper end 48 of differential link 45 extends from its lower section 47 and is pivotally attached to control surface push rod clevis 18 as by suitable bolt and nut fasteners 49 which will also be referred to as pivot 49. The upper end of servo link 46 is rigidly secured to the end of a shaft 50, similarly extending from the interior of and journalled in suitable bearings, schematically illustrated at 10" in FIG. 4, in the same sidewall of housing 10, as by a spline and pin connection 51. It will be noted that the lower end of servo link 46 is bifurcated so that it straddles and is pivotally fastened, as by bolt and nut fastener 52, to the center of the lower truncated portion 53 of differential link 45. The bolt and nut 52 will also be referred to as pivot 52. Between the upper pivot 49 of differential link 45 and its lower pivot 52, is pivotally attached the common link parallel links 29 from link 25, again as by bolt and nut fasteners 54, again also being referred to as pivot 54. It will be noted that in this embodiment, parallel links 29 provide an opening 55 into which the lower frame section 47 differential of link 45 may pass during operation of the actuator, as will be described below.

Referring again to FIG. 4, the elements within the actuator housing 20 associated with the protruding shaft 50 and hereinafter referred to as the series servo actuator assembly 57, will now be described. The shaft 40 secured to servo link 46 is connected to be driven by dual servomotors 60 and 61 through differential gearing 62 and gear train 63. Motors 60 and 61 each include a tachometer 60', 61' for providing a series servo system damping signal in a conventional fashion. In accordance with the present invention, the servomotors 60 and 61 drive shaft 50 through irreversible gear trains 64 and 65, respectively, so that the servo link 46 cannot drive backwardly into the servomotors and therefore effectively provide at pivot connection 52 a fixed but servo adjustable pivot point for the differential link 45, as will be described below. Thus, the drive link 46 is prevented from being positioned except by operation of the servomotors. Driven from shaft 50 through one-to-one antibacklash gearing 66 are further signal generators or synchros 66 and 67. As will be described further below, these synchros provide surface position feedback signals for the servosystem energizing the servomotors 60 and 61. It should be noted here that the series servo function of the actuator of the present invention is provided by dual servomotors 61 and 62 acting jointly through differential 62 as taught in a number of the present assignees' patents, such as U.S. Pat. Nos. 3,504,248; 4,035,705; 4,094,481; and 4,159,444 and 4,162,438. However, it will be understood that the actuator of the present invention is equally applicable in systems employing a single servomotor, it being important of course that it drives shaft 50 through an irreversible gearing.

Referring once more to FIG. 3 and also to FIGS. 6 and 7, the unique authority limit stops of the present invention will now be described. However, before proceeding with this description, it will be appreciated that FIGS. 6 and 7 illustrate another embodiment of the present invention wherein the feel/trim actuator 10b with its internal elements 31 of FIG. 3 are enclosed in a separate housing and wherein the series actuator 10a with its internal elements 57 are also enclosed in a separate housing. The feel/trim actuator housing 10b and series servo housing 10a may be separately strapped down to the airframe structure at different locations; for example, the former near the control stick and the latter near the boost actuator as illustrated in FIG. 2B. Note that the common interconnecting link 29 may be bifurcated at its respective ends to accommodate the lever 25 of the trim/feel actuator 10b and to accommodate and provide free passage for the link 45 during operation and thus function identically to the parallel links 29 of FIG. 3.

Continuing now with the description of the authority limit mechanism of the present invention, there are two authority limits, one for limiting the range of authority of the series servo 60, 61 over the control surface displacement whereby to limit surface deflection should the series servo for some reason fail, and the other limiting the range of the total authority of the control stick over the control surface displacement as defined by the particular aircraft characteristics, regardless of the position of the series servo. In accordance with the teachings of the present invention, both of these displacement limits are provided by a specially designed stop block 70 which is rigidly secured, as by suitable machine screws 71, to the lower side of the housing 10 below the linkage assembly 15 and extending symmetrically laterally relative to shaft 50. Stop block 70 comprises generally a two-step configuration, one step 72, which may be referred to as the rear step, lying generally in the plane including the rear bifurcation 73 of the servo link 46 and the other 74, which may be referred to as the front step, lying generally in the plane including the differential link 45. The rear step portion 72 of block 70 is machined to provide a generally U-shaped cut-out so as to form internal stop surfaces 75 and 76 symmetrically laterally spaced relative to the series servo shaft 50. As shown most clearly in FIGS. 6 and 7, these stop surfaces or abutments limit the angular rotation of servo link 46 to a predetermined value or number of degrees by the rear bifurcation 73 of link 46 striking either of the stop surfaces 75 or 76. The bifurcation 73 constitutes a part of the drive link 46 which projects from the plane of the differential link 45 and drive link 46. The front step 74 is machined so as to form two generally arcuate stop surfaces 77 and 78 intersecting at the center of the block 70 and extending symmetrically and generally laterally relative to the shaft 50. According to the invention, these stop surfaces cooperate with stop protuberances 79 and 80 respectively on the side arms of the pie-shaped frame section 47 of differential link 45. The arcuate stops 77, 78 are so contoured that the total rotational movement of the differential link 45 by the control stick is limited to a predetermined constant value regardless of the angular rotation or position of the servo link 46 and hence provide a predetermined limit on the total output motion of the actuator to the control surface by the control stick regardless of series servo link position. In accordance with the invention, the limit block 70 is removably secured to the housing 10 so that different blocks may be machined and installed in order to satisfy the different authority limit specifications of the various aircraft in which the basic actuator is to be installed.

Figure 8:
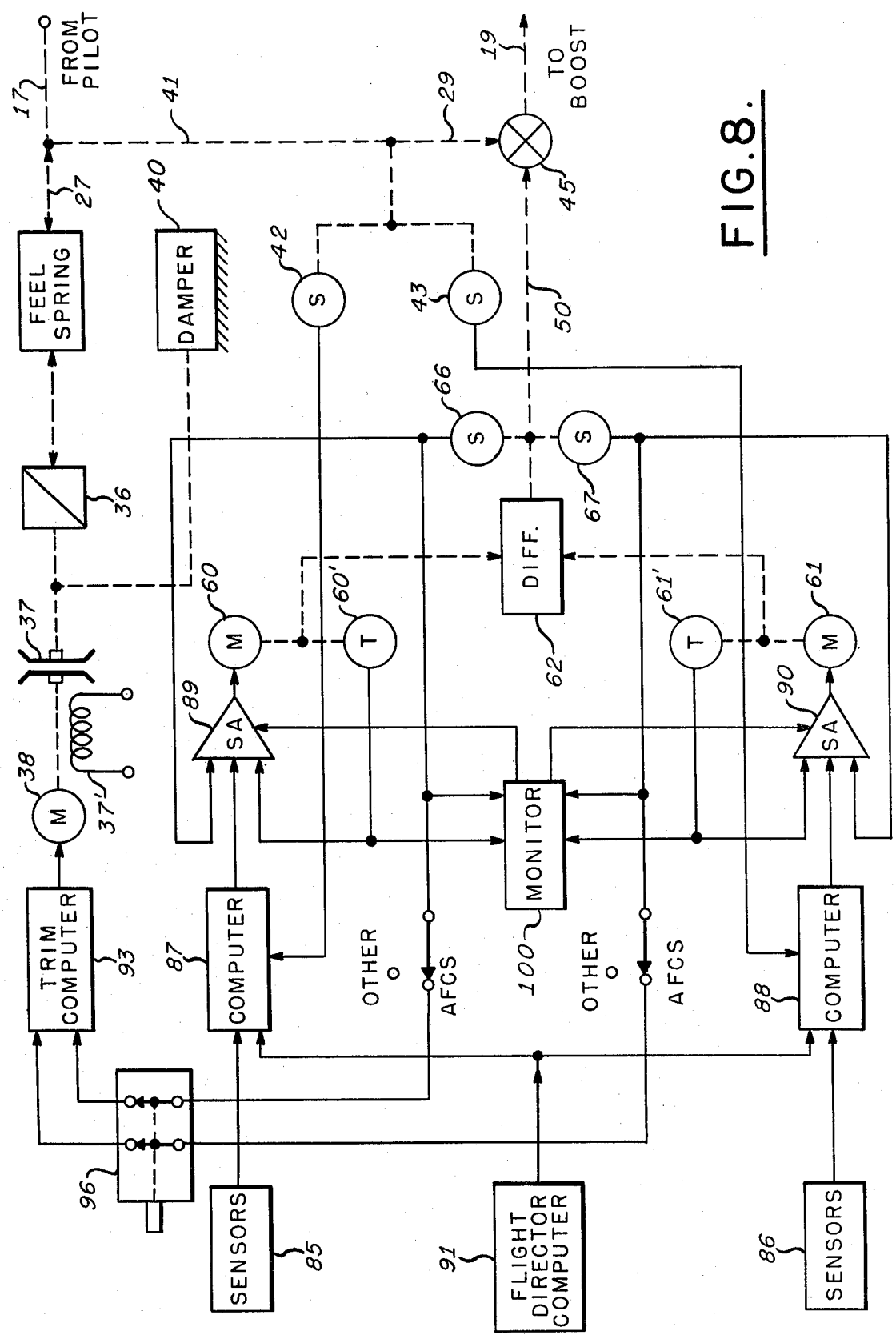
FIG. 8 is a schematic illustration of a typical electrical control system for controlling the various elements of the actuator.

In FIG. 8 there is illustrated a typical automatic stability augmentation system (SAS) for a helicopter employing the dual servo techniques described in detail in the above listed U.S. Patents, together with navigation command inputs to thereby provide a complete AFCS. The structure and operation of a stability augmentation system is well established and well known to those skilled in the automatic flight control art but for completeness of this specification reference may be made to the present assignees' U.S. Pat. No. 4,109,886. Also, while FIG. 6 illustrates a dual sensing and computation channel system, it will be understood that a single sensing and computation channel may be employed, the output of the single computer being divided between the dual servo loops as disclosed in U.S. Pat. No. 4,159,444. In FIG. 8, like reference characters are applied to like elements illustrated in FIGS. 3-7. As in a SAS channel of the character illustrated in the block 23 of FIG. 1 of the referenced U.S. Pat. No. 4,109,886, the sensors 85 and 86 of FIG. 8 hereof may be vertical gyros from which signals proportional to the vehicle's short term motion are derived using suitable high frequency deriving networks within the computers 87 and 88 which signals are summed with suitably shaped stick position signals from synchros 42 and 43. Series servo command outputs of computers 87 and 88 are applied to servo amplifiers 89 and 90 where they are summed with surface position feedback signals from synchros 66 and 67 and effective surface rate signals from tachometers 60' and 61'. The servo amplifier outputs are supplied to series servo motors 60 and 61, each of which drive into the inputs of mechanical differential 62, through the irreversible gear trains 64 and 65, the output of which positions the series servo link 46 through shaft 50. This over-all operation is described in detail in the referenced patents, particularly U.S. Pat. Nos. 4,109,886 and 3,504,248. Also as taught in U.S. Pat. No. 4,109,886, automatic pilot (AFCS) functions such as navigation, long term attitude and path control may be provided by the system of FIG. 8 wherein the output of flight director computer 91 may also be supplied to computation circuits 87 and 88. The various modes of operation, for example, SAS, AFCS, etc. may be manually selected by the pilot by conventional mode select switching well understood by those skilled in this art.

In the AFCS mode, the actuator of the present invention may be used to provide automatic trim through trim servomotor 38. This is conventionally provided by monitoring in the trim computer 93, any long term series servo deflection as reflected by the position of feedback synchros 66 and 67. When such series servo deflection persists for a predetermined period, trim computer 93 drives trim servo 38 through the irreversible gearing 39, normally engaged clutch 37 and feel spring 35 as will be described below. It should be noted, however, that when operating in the AFCS mode, any pilot induced motion of the control stick should inhibit the automatic trim function just described. This may be accomplished as illustrated in FIGS. 5 and 8. One of the support members or part 94 for the feel spring 95 has fastened to it, preferably within the feel spring, a normally closed switch 96 having a spring loaded actuating plunger 97. The plunger 97 cooperates with a cam surface 98 on the other feel spring support member or part 99 whereby upon relative rotation between the two members, as by a predetermined control stick force, the switch 96 will by opened thereby inhibiting trim motor 38 from operating. It is seen in FIG. 8 that this operation is only effective during the AFCS mode.

Should a failure occur in one of the channels of the dual servosystem, it will be reflected in an erratic operation of the failed channel's servomotor 60, 61 and tachometers 60', 61' and through differential 62 an erratic operation of the feedback synchros 66, 67 as taught in any one of the dual servo patents referenced above. For monitoring the operation of the dual servosystem, the synchro and tachometer outputs of each of the channels is applied to monitor 100 which detects the failed channel and disables its servo amplifier permitting the surviving channel to maintain control. Detailed disclosures of a typical monitor for a dual servosystem of the character generally illustrated in FIG. 6 are provided in the above-referenced dual servosystem patents, for example, U.S. Pat. Nos. 3,504,248 or 4,094,481.

Having now completed a description of the structure of the multifunction actuator of the present invention, its over-all function will now be described in connection with the following modes: manual only with artificial feel and two types of manual trim (automatic trim having just been described), series servo only and combined manual and series servo.

Assume first that the multifunction actuator is secured to the airframe structure as illustrated in either FIG. 2A or 2B and the linkages 14 and 15 are connected by push rod 17 to the pitch axis of the pilot's cyclic stick and by push rod 19 to the pitch control surface (rotor pitch tilt mechanism). Assume also that neither the SAS nor AFCS is operating and through conventional electrical interlocks the series servomotor has been positioned at a zero or neutral position, that is, the servo link 46 is vertically disposed relative to housing 10 and its lower end centrally positioned between stops 75 and 76 as suggested by its dotted line position in FIG. 6. If the pilot desires to manually command a pitch attitude change he, say, pushes forward on the cyclic stick thereby moving push rod 17 to the left, as viewed in FIGS. 3, 6 and 7, and in turn the lever or bar link 25 to the left, the latter motion rotating shaft 27 and simultaneously translating parallel bar links 29 to the left. Since the lower pivot 52 of servo link 46 is fixed, due to the irreversible gearing 64, 65 of series servomotors 60, 61, the bar links 29 rotate differential link 45 counterclockwise, pivoting about its fixed lower pivot 52 and imparting the control stick motion to the control surface push rod 19. Rotation of the shaft 27 by link 25 tends to rotate one end 94 of torsion spring 95, its other end 99 being fixed through normally engaged clutch 37 and the irreversible gearing 39 of trim servomotor 38, thereby imparting an artificial feel for the pilot; that is, the torsion spring provides a simulation of the control surface load. In the manual only mode the total authority of the control stick over the control surface is limited by limiting the rotation of differential link 45. This is accomplished under the above assumed command by the protuberance 80 abutting the contoured stop surface 78 as generally illustrated in FIG. 7.

As is well known to those skilled in the helicopter flight control art, manual trim may be accomplished in two basic ways, one by means of a simple trim push button on the control stick and the other by means of a so-called beeper switch also on the control stick. Since both trim techniques are well known in the art and also described in the above-referenced U.S. Pat. No. 4,109,886, the trim initiation switches are not herein shown. However, the multifunction actuator of the present invention provides trim actuation for either or both of these techniques. For example, and still in the manual only mode of operation, assume that the aircraft is in an out of trim condition, that is, the pilot must maintain a sustained force on the control stick to maintain a desired pitch attitude. In the simplest trim mode, the pilot presses the trim button on his stick and thereby disengages clutch 37 through clutch winding 37' and relaxes his sustained force on the stick and allowing manual retrimming of the control surface through the linkage 14 and 15 as described above. It will be noted that the damper 40 is provided to prevent a sudden unwinding of the feel spring 35 and a possible objectional sudden bump reflected on the control stick. In the more complex trim technique, the pilot may press the beeper slide switch on the control stick in the required direction which supplies a corresponding drive voltage to the trim motor 38 which drives through the irreversible gearing 39, normally engaged clutch 37 and feel spring 35 to trim the control surfaces and control stick through the linkages 14 and 15 as above described.

In describing the series servo only mode of operation of the multifunction actuator of the present invention, assume that the helicopter is operating in the SAS mode and not being manually maneuvered by the pilot through the control stick. Under this condition, linkage 25 and parallel links 29 are maintained fixed by the feel spring 35 and irreversible gearing 39. It will be noted that the feel spring tension is greater than rigging load into the boost actuator or greater than the surface load in systems not employing a boost actuator. Now assume an external force tends to disturb the helicopter's pitch attitude. The SAS sensors 85, 86 detect such change and supply a corresponding signal to servo amplifiers 89, 90 which in turn energize servomotors 60, 61 and cause them to drive through differential 62 to rotate servo link 46, say counterclockwise as shown in FIG. 6. Since pivot 54 on parallel link 29 is now fixed, rotation of servo link 46 produces a counterclockwise rotation of differential link 45 and a resultant translation of control surface push rod 19 to deflect the control surface in a manner to oppose the disturbance. Servomotor velocity signals from tachometers 60', 61' and position signals from synchros 66, 67 stabilize and close the servo system control loop in conventional fashion. Since the irreversible drive 39 and torsion spring 35 prevent movement of the control stick during operation of the servomotors 60, 61, it will be recognized that the multifunction actuator operates in the well known series servo manner. Normally, the authority of a series servosystem is relatively limited for flight safety purposes. According to the invention, this limited authority is provided by the mechanical stop surfaces 75 and 76 on stop block 70 which are contacted by the rear bifurcation 73 of link 46 as illustrated in FIGS. 6 and 7.

From the foregoing, it will be readily apparent that the multifunction actuator of this invention will operate simultaneously to provide both manual and automatic series servo control of the control surfaces. This is illustrated in FIG. 7 wherein the manual stick has positioned differential link 45 and series servo has positioned the servo link 46 as described above to produce a resultant summed displacement of control surface push rod 19. In FIG. 7, both motions have been illustrated at their limited extremes to demonstrate that the total authority limits on the control surface push rod 10 remains constant regardless of the position of the series servo link 46. For example, with the differential link 45 in its extreme counterclockwise limit and the servo link 46 in its extreme counterclockwise limit as illustrated in FIG. 7, assume that the servo link now rotates to its extreme clockwise limit. Since the pivot point 54 of parallel links 29 remains fixed, this clockwise rotation of servo link 46 will rotate differential link 45 about pivot 54 moving pivot 49 slightly to the right with the stop part 80 lifted off stop surface 78. Thus, the manual stick may be moved to the left until part 80 again strikes the stop surface 78 but note that the total maximum authority of the control stick has not been exceeded and remains the same.

The present specification has described preferred embodiments of a multifunction actuator apparatus ideally suited to, but not limited to, helicopters and particularly useful in both original installation of SAS and AFCS equipment into new aircraft and retrofitting such equipment into existing craft with minimum modification to the existing primary flight control rigging. It is now evident that it provides the combined function of series servo actuation, trim servo actuation, artificial feel, series servo position sensing, control stick position sensing and manual stick and series servo authority limiting, all of these functions being achieved by strapdown actuator apparatus which are hard mounted to the airframe structure thereby eliminating many problems otherwise associated with high vibration environments. While preferred embodiments of the invention have been specifically described and illustrated, other embodiments of the basic concepts disclosed and taught herein may be evident to those skilled in the helicopter and also the fixed wing flight control art. Therefore, the words and terms used herein are to be interpreted as words and terms of description rather than of limitation and that many changes may be made within the purview of the appended claims without departing from the true scope and spirit of the invention in its broadest aspects.

We claim:

1. A multifunction actuator apparatus for aircraft including a series actuator, the combination comprising:
   housing means adapted to be mounted directly on the aircraft structure adajcent to the primary pilot controller-to-control surface actuation members and including first and second drive shafts journalled in said housing means,
   first linkage means drivably supported on said first drive shaft and coupled with said pilot controller member,
   second linkage means including a drive link drivably supported on said second drive shaft and further including a differential link coupled between said control surface member, and drive link and said first linkage means,
   series servomotor means including means drivably connecting said servomotor to said second drive shaft for positioning said drive link, and
   first and second authority limit means secured to said housing means adjacent said differential link and drive link and cooperable therewith, said first limiting means limiting the position of said pilot controller member between first predetermined maximum limits and said second limiting means limiting said drive link between second predetermined maximum limits.

2. The actuator apparatus as set forth in claim 1 wherein said housing means is a unitary housing structure.

3. The actuator apparatus as set forth in claim 1 wherein said housing means comprises at least two unitary housing structures, each adapted to be mounted directly on the aircraft structure, one including said first linkage means and the other including said second linkage means, and common interconnecting linkage means coupled between said first and second linkage means.

4. In multifunction actuator apparatus for aircraft having pilot controller-to-control surface actuation members and including first linkage means responsive to movement to said pilot's controller the combination comprising, a series servo actuator including housing means adapted to be secured directly on the aircraft generally adjacent said actuation members, and further including a drive shaft journalled in a wall of said housing means,
   second linkage means including a drive link drivably supported on said drive shaft and further including a differential link coupled between said control surface actuation member, said drive link and said first linkage means,
   series servomotor means including means drivably connecting said servomotor to said drive shaft for positioning said drive link, and
   first and second authority limit means secured to said housing means adjacent said differential link and drive link and cooperable therewith, said first limiting means limiting the position of said pilot controller member between first pedetermined maximum limits and said second limiting means limiting said drive link between second predetermined maximum limits.

5. The actuator apparatus as set forth in any one of claims 1, 2, 3 or 4 wherein said authority limit means comprises:
   a first pair of spaced stop surfaces cooperative with said drive link for limiting the position of said drive link between first predetermined maximum limits, and
   a second pair of spaced stop surfaces cooperative with said differential link for limiting the motion of said differential link between second predetermined maximum limits, the surface contours thereof being such as to limit said differential link motion between said second maximum limits regardless of the position of said drive link.

6. The actuator apparatus as set forth in claim 5 wherein said authority limit means comprises a unitary stop structure removably secured to said housing, whereby stop structures contoured to the specific authority limit requirements of a specific aircraft may be secured to said housing.

7. The actuator apparatus as set forth in claim 5 wherein said differential link includes an open frame-like structure, wherein said drive link is substantially coplanar with said differential link and operates within said frame-like structure opening, and wherein said authority limit means includes first stop means cooperative with a part of said drive link for limiting the position thereof between said first predetermined maximum limits and second stop means substantially coplanar and cooperative with said open frame-like structure for limiting the position of said differential link between said second predetermined maximum limits.

8. The actuator apparatus as set forth in claim 7 wherein said drive link is pivotally attached to said frame-like structure and includes a part projecting from the plane thereof, which part cooperates with said first stop means to thereby limit said maximum position of said drive link.

9. The actuator apparatus as set forth in claim 7 wherein the contour of said second stop means is such as to limit said differential link motion between said second limits regardless of the position of said drive link.

10. The actuator apparatus as set forth in claims 1, 2, 3 or 4 wherein said servomotor drivable connecting means includes irreversible drive means for preventing said drive link from being positioned except by operation of said servomotor means.

11. The actuator apparatus as set forth in claim 1, 2, 3 or 4 wherein said servomotor means comprises:
    dual servomotors,
    differential means including means drivably connected with each of said servomotors and providing a resultant output for positioning said drive link,
    each of said drivable connection means including irreversible drive means for preventing said drive link from being positioned except by said differential means.

12. The actuator apparatus as set forth in claim 1, 2 or 3 further including signal generator means coupled with said second drive shaft for providing a shaft position feedback signal for governing the operation of said servomotor means.

13. The actuator apparatus as set forth in claim 1, 2 or 3 further including:
    feel spring means having a first part thereof connected with said first drive shaft and a second part connected with means providing a normally fixed reference position, whereby rotation of said first linkage means is yieldingly opposed by said feel spring thereby providing artificial surface load feel for said pilot controller.

14. The actuator apparatus as set forth in claim 13 wherein said normally fixed reference providing means comprises:

a trim servomotor means and irreversible drive means responsive thereto for preventing positioning of said second feel spring part except by operation of said trim servomotor.

15. The actuator apparatus as set forth in claim 14 wherein said normally fixed reference means further includes clutch means which when engaged couples said irreversible drive means and said second feel spring part and when disengaged uncouples said second feel spring part from said irreversible drive means and permits adjustment of said feel spring part by said first linkage means and pilot controller.

16. The actuator apparatus as set forth in claim 14 further including damper means coupled with said second feel spring part for damping any spring force on said second feel spring part upon declutching of said clutch means.

17. The actuator apparatus as set forth in claim 14 further including signal generating means coupled with said first drive shaft for providing a signal proportional to the position of said pilot controller.

18. The actuator apparatus as set forth in claim 13 wherein said feel spring includes electrical switch means coupled between said first and second feel spring parts for providing a control signal upon a predetermined relative differential position of said parts.

* * * * *